May 11, 1926.
C. C. EGBERT
1,584,523
PRESSURE RELIEF DEVICE
Filed May 4, 1923
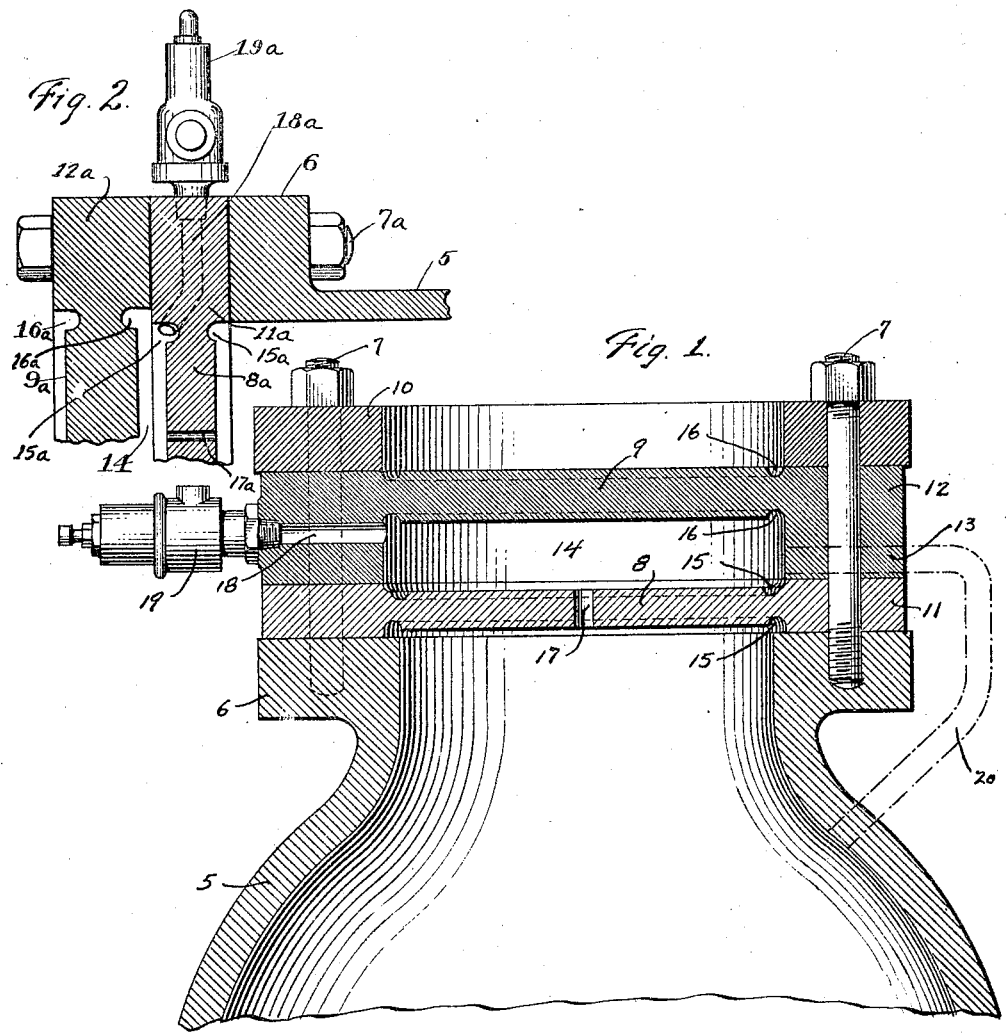
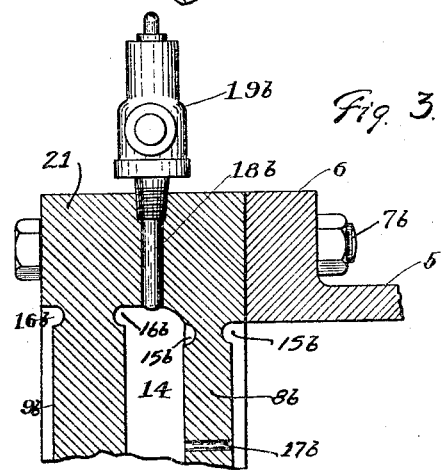
Charles C. Egbert INVENTOR
BY J. W. M. Ellis
ATTORNEY Patented May 11, 1926.

1,584,523

UNITED STATES PATENT OFFICE.

CHARLES C. EGBERT, OF NIAGARA FALLS, NEW YORK.

PRESSURE-RELIEF DEVICE.

Application filed May 4, 1923. Serial No. 636,587.

My invention relates generally to safety devices, in the nature of bursting plates, used to relieve the pressure within any receptacle, and more particularly to a device for use in connection with penstocks supplying water for driving turbines.

It is well known to those skilled in the art, that prior to my invention of a pressure-relief device, for which I obtained Letters Patent of the United States of America, No. 1,394,072 on October 18, 1921, bursting plates used in pressure devices had to be constructed with a very small factor of safety in order to be effective as a means of relieving pressure. The experience was that the pulsations in pressure which usually occur in a penstock following sudden variations in the quantity of water discharged from the turbine supplied by the penstock, weakened a bursting plate, having a low factor of safety, to such a degree that it burst unexpectedly at a lower pressure than that which it was designed to sustain, that is, it burst under ordinary operating conditions with attending loss of service, and the expense and annoyance in replacing broken parts.

The principal object of my invention has been to provide a pressure-relief device which will overcome the objections above set forth, and one which will have a sufficient factor of safety to insure against bursting under ordinary conditions of service, but one which will burst at the predetermined excessive pressure, and thereby relieve the penstock of dangerous stresses which will be produced by the unrelieved pressure surge, or water hammer.

Another object has been to provide a pressure-relief device, having a plurality of bursting plates, acting together to close an opening in a receptacle, and so that the fluid pressure therein is divided between them, one plate sustains a substantially constant pressure not materially exceeding the normal pressure, until the predetermined bursting pressure has been reached.

Furthermore, I have sought to provide a device which is simple and inexpensive to construct and maintain, and also one which is certain in its operation.

The above objects and advantages have been accomplished by the device shown in the accompanying drawings, of which:

Fig. 1 is a longitudinal, sectional elevation, taken through the center-line of my device.

Fig. 2 is a fragmentary view of a modified form of my invention.

Fig. 3 is a similar view of another modification.

In this specification, I will describe my invention as applied to a penstock supplying water to a turbine, it being obvious that the device is applicable to any receptacle carrying fluid under pressure.

In the drawing, 5 represents the nozzle or branch of a penstock having the usual flange 6. To the flange 6 of the branch 5 is secured, by means of a plurality of bolts 7, an inner bursting plate 8, and an outer bursting plate 9, on top of which is disposed a distributing ring 10, which serves to equalize the pressure produced by the bolts 7. This ring may be omitted when the pressure in the penstock is comparatively light. The plate 8 is carried by an integral ring 11, and the plate 9 is carried by an integral ring 12. The ring 12 is provided with an extension 13 which makes the combined thickness very much greater than the plate 9, whereby a space 14 is provided between the plates 8 and 9. It is obvious that the extension 13 may be made in the form of a separate ring; but since this involves the use of an additional packed joint, I prefer to make it an integral part of the ring 12. The plates 8 and 9 may be made of any desired thickness; and so as to give to each a predetermined bursting strength, an annular groove 15 is provided at each side of the plate 8 and an annular groove 16 is provided at each side of the plate 9. These grooves are preferably placed near the outer periphery of the plate, or at a point where it joins its flange. The grooves 15 are, however, of smaller diameter than the grooves 16 of the outer plate, whereby the plate 8 may be free to pass out through the opening made by the plate 9.

The plate 8 is provided with a central aperture 17 of restricted size, which provides a passageway for a limited quantity of fluid to pass from the penstock branch 5 to the space 14. An aperture 18 is provided in the flange extension 13, at the outer end of which is disposed an automatic pressure-relief valve 19. This valve is a standard article of commercial manufacture and need not, therefore, be described in detail in this specification, except to state that it is of a type which will automatically discharge when a predetermined pressure is reached or exceeded. This pressure-relief valve has a discharge opening. The relief valve usually has sufficient discharge capacity to prevent the water, which enters the space 14 through the hole 17, from exceeding a predetermined maximum pressure in the space 14, which is preferably slightly in excess of the normal fluid pressure in the penstock branch 5.

The grooves 15 in the inner plate 8 are cut to such a depth that the amount of metal between the two registering grooves is such as to give to this plate a bursting strength equal to substantially the difference between the predetermined bursting strength of the outer plate minus the normal penstock pressure. The grooves 16, cut in the outer plate 9, give to this plate a bursting strength equal to the predetermined bursting pressure.

In the form, shown in Fig. 2, the distributing ring 10 of the first form described has been omitted, and the outer bursting plate $9^a$, instead of having the extension 13, is provided only with a flange $12^a$. The inner bursting plate $8^a$ in this form is provided with a flange $11^a$ through which an aperture $18^a$ is formed for the pressure relief valve $19^a$. Bolts $7^a$ secure the flanges $12^a$ and $11^a$ to the flange 6 of the penstock branch. The inner plate $8^a$ is provided preferably with a plurality of passageways $17^a$. The inner plate $8^a$ in this form is provided with a groove $15^a$ on each side thereof, and the outer plate $9^a$ is likewise provided with opposite grooves $16^a$.

The form of invention shown in Fig. 3 is provided with an outer bursting plate $9^b$ and an inner bursting plate $8^b$. Instead, however, of each of these plates having a separate flange, they are made a part of a single integral flange 21, which is secured to the flange 6 of the penstock branch by means of bolts $7^b$. The space 14 between the plates $9^b$ and $8^b$, as well as the inner grooves $16^b$ and $15^b$ are provided on the exposed surfaces of the plates $9^b$ and $8^b$, respectively. The plate $8^b$ is provided preferably with a plurality of passageways $17^b$. The flange 21 is provided with a passageway $18^b$ for communication with the relief-valve $19^b$, secured at the upper end of the passageway.

In both of the modified forms just described the grooves formed in the inner bursting plates $8^a$ or $8^b$ are smaller in diameter than the grooves formed in the outer bursting plates $9^a$ or $9^b$.

It will be clear from the foregoing description, that when the penstock branch 5 is filled with water, the water will flow through the aperture 17 in the inner plate 8 and into the space 14. The space 14 will, of course, be filled with water and the pressure within it will rise to a point not more than the pressure at which the relief valve 19 is set to discharge, which, as hereinbefore stated, is preferably slightly above the normal fluid pressure in the penstock 5. When the pressure in the penstock rises above normal, the valve 19 holds the pressure within the space 14 to a pressure substantially the same as the normal penstock pressure, as a result of which water will discharge through the aperture 17 into the space 14, but since the valve 19 is provided with a discharge capacity substantially the same or greater than the discharge capacity of the aperture 17, the pressure within the space 14 remains substantially constant until the inner plate 8 bursts. However, when the predetermined bursting pressure has been reached, and the plate 8 breaks, the pressure within the space 14 will, of course, be increased and the water will enter the space 14 faster than it can be taken care of by the discharge of the relief valve 19. When the plate 8 breaks, therefore, the pressure of the water within the penstock is suddenly thrown against the outer plate 9 which will cause it to rupture and allow the water to be discharged from the penstock 5. As hereinbefore pointed out, the grooves 15 in the inner plate are smaller in diameter than the grooves 16 of the outer plate, whereby the inner plate will be free to pass through the opening made by the plate 9, whereupon the plates will be instantly pushed out of the way by the water and the excessive pressure quickly relieved.

Owing to the interspaced arrangement of the two bursting plates, the inner plate having a relatively small opening and the automatic relief valve connected with the space between the plates, it will be seen that the outer bursting plate 9 is protected from pulsating pressures and will be steadily loaded at not exceeding practically normal pressures until its predetermined bursting pressure is suddenly thrown upon it. Since the water pressures on both sides of the inner plate 8 are substantially balanced, under normal penstock conditions, this plate withstands the pulsating pressure in the penstock with a large factor of safety, but does not yield until the predetermined bursting strength has been exceeded. This is brought about because the automatic relief valve 19 and the opening 17 substantially prevent pressure surges within the space 14, when the ordinary surge occurs in the penstock. Since the plate 9 is not subjected to the momentary increases in pressure due to normal pulsations in the penstock, it is not, therefore, weakened by such surges, and this plate is, therefore, less liable to rupture before the predetermined bursting pressure is reached than in structures heretofore used in which the full pulsating fluid pressure is sustained by a single bursting plate. For illustration let us assume an example in which the normal pressure in the penstock is 100, the predetermined bursting pressure is 150, and the ordinary surges in the penstock are 125. Under the above conditions, the factor of safety of the old type of a single bursting plate would be 150 divided by 125, that is 1.2. It is well known that a plate continually subjected to pulsating pressure tends to weaken and the factor of safety of 1.2 is not high enough for practical purposes. Assuming the same example in connection with my apparatus, it will be seen that, since the inner plate 8 is designed to burst when the load imposed upon it is 50, or the difference between the assumed predetermined bursting pressure of 150 and the assumed normal penstock pressure of 100. When an ordinary surge of 125 occurs in my device, the load on the plate will be 125 minus 100 or 25. Since the plate will burst when the difference in pressure is 50, the factor of safety will be 2, or 50 divided by 25.

It will be clear that a shut-off valve of any of the well known standard types may be inserted in the penstock to be used after the pressure-relief device has functioned, and thus permit the replacement of broken plates without emptying the entire penstock.

Instead of providing the inner plate 8 with an aperture 17 for conducting water from the penstock 5 to the space 14, it is clear that the interior of the penstock branch 5 may be connected with the space 14 by means of a pipe 20 (indicated by dot and dash lines) connecting the penstock with the extension 13 of the flange 12 of the plate 9. Furthermore, if desired, a number of pressure-relief valves may be employed, so that if one of them should fail to function, another would act. Moreover, instead of using but one centrally arranged aperture 17 through the inner plate 8, a number of small openings may be used having a combined discharge capacity equal to the discharge capacity of the aperture 17. These and other modifications of the details herein shown and described may be made without departing from the spirit of my invention, or the scope of the appended claims; and I do not, therefore, wish to be limited to the exact embodiment herein shown and described, the form described being merely a preferred embodiment thereof.

Having thus described my invention, what I claim is:

1. The combination with a receptacle containing fluid under pressure of a pressure-relief device characterized by having two fixed plates, each plate being provided with weakened portions of predetermined strength, the plates being arranged with a space between them, and means for maintaining a constant fluid pressure in the space, whereby one of said plates is normally balanced and subjected to pulsating pressure, and the other plate is subjected to steady pressure.

2. The combination with a receptacle containing fluid under pressure, of a pressure-relief device characterized by having an outer fixed plate, an inner fixed plate, the plates being arranged in interspaced relation and secured over an opening in the receptacle, each plate having grooves formed in its face, the inner plate having an opening therethrough, and a pressure-relief valve in communication with the space between the plates, whereby the outer plate will be steadily loaded while the inner plate will be subjected to the pulsating pressure in the receptacle.

3. The combination with a receptacle containing fluid under pressure, of a pressure relief device characterized by having two fixed plates of predetermined strength, the plates being arranged with a space between them, and means for maintaining and limiting the fluid pressure in the space whereby one of said plates is normally balanced and subjected to pulsations and pressure above the normal pressure while the other plate is subjected to steady pressure and the fluid pressure in the receptacle is divided between the said two plates.

4. The combination with a receptacle containing fluid under pressure, of a pressure-relief device characterized by having a plate exposed to the pulsating pressure existing within the receptacle, and another plate in interspaced arrangement with the first plate and exposed to the normal predetermined steady pressure existing within the receptacle.

5. The combination with a receptacle containing fluid under pressure, of a pressure-relief device characterized by having two interspaced plates both subjected to the pressure of the fluid within the receptacle and each being so designed as to withstand a predetermined pressure, one supplementing the other in retaining the fluid pressure in the receptacle.

6. The combination with a receptacle containing fluid under pressure, of a pressure-relief device characterized by having two interspaced plates each being so designed as to withstand a predetermined pressure, one supplementing the other in retaining the fluid pressure in the receptacle, and means for dividing the fluid pressure between the plates.

7. The combination with a receptacle containing fluid under pressure, of a pressure-relief device characterized by having two interspaced plates each being so designed as to withstand a predetermined pressure, one supplementing the other in retaining the fluid pressure in the receptacle, one of the plates sustaining the normal fluid pressure in the receptacle until a predetermined pressure is reached, and the other plate sustaining pulsations in pressure in excess of the normal pressure in the receptacle until the predetermined pressure is reached.

8. The combination with a receptacle containing fluid under pressure, of a pressure-relief device characterized by having two interspaced plates each being so designed as to withstand a predetermined pressure, and means for dividing the fluid pressure between them.

9. The combination with a receptacle containing fluid under pressure, of a pressure-relief device characterized by having an inner bursting plate, an outer bursting plate in interspaced relation with the inner plate, a fluid passageway between the interior of the receptacle and the space between the plates, and means for controlling the fluid pressure in the space, whereby one plate will supplement the other plate in retaining the fluid pressure in the receptacle.

10. The combination with a receptacle containing fluid under pressure, of a pressure-relief device characterized by having an inner bursting plate, an outer bursting plate, a confined space between the plates, a fluid passageway between the interior of the receptacle and the space between the plates each plate supplementing the other in retaining the fluid pressure in the receptacle, and means for controlling the fluid pressure in the space until the predetermined pressure in the receptacle is reached, whereby when the inner bursting plate gives way, the pressure in the receptacle is thrown upon the outer bursting plate.

In witness whereof, I have hereunto signed my name.

CHARLES C. EGBERT.